United States Patent [19]

Hayasaka

[11] Patent Number: 4,786,889

[45] Date of Patent: Nov. 22, 1988

[54] BATTERY CASING FOR A PAGING RECEIVER

[75] Inventor: Sigeki Hayasaka, Tokyo, Japan

[73] Assignee: NEC Corporation, Tokyo, Japan

[21] Appl. No.: 939,976

[22] Filed: Dec. 10, 1986

[30] Foreign Application Priority Data

Dec. 10, 1985 [JP] Japan .......................... 60-189798[U]

[51] Int. Cl.[4] .......................... H04Q 1/30; G08B 5/22

[52] U.S. Cl. ............................ 340/311.1; 340/825.46; 340/407; 455/90

[58] Field of Search ................ 340/311.1, 407, 825.46, 340/825.44, 404, 825.19; 455/90

[56] References Cited

U.S. PATENT DOCUMENTS 3,618,070 11/1971 Kasan .................................. 340/407

4,641,370 2/1987 Oyamada .............................. 455/90

*Primary Examiner*—Donnie L. Crosland

*Attorney, Agent, or Firm*—Sughrue, Mion, Zinn, Macpeak and Seas

[57] ABSTRACT

A paging receiver having a function of alerting a person to reception by causing a motor to vibrate a housing of the receiver is disclosed. A generally box-like motor receiving portion is positioned on the outer side periphery of a battery casing and provided with a recess which is complementary in shape to a motor. A cover is positioned to cover the motor, which is placed in the motor receiving portion, and fastened to the motor receiving portion to fix the motor to the same portion. The battery casing includes a side wall which is shaped flat complementary to a ROM, and is made of a semi-transparent material, so that a ROM function label is visible from the outside merely by removing a battery cover. A flat metal fitting is press-fitted in a box-like projection which extends from a part of the side wall of the battery casing, whereby the printed circuit board and the battery casing are rigidly connected together.

5 Claims, 4 Drawing Sheets

BATTERY CASING FOR A PAGING RECEIVER

BACKGROUND OF THE INVENTION

The present invention relates to an improvement in a battery casing for a paging receiver and other portable radios and, more particularly, to a motor mounting structure for a paging receiver in which a motor is installed for causing a housing of the receiver to vibrate to alert a user of the receiver to reception.

Generally, a paging receiver is provided with a battery casing for accommodating a battery which is adapted to power the receiver, the battery casing including a battery cover. A printed circuit board to be electrically connected to both terminals of the battery is built in the housing of the receiver. In relation to such a paging receiver, two different approaches are available for a person to be informed of reception, i.e., generation of sound and vibration of a receiver housing. A paging receiver with the vibration type alert scheme, therefore, is further provided with a motor to cause the housing into vibration. Usually, a paging receiver with the sound type alert scheme is modified, or remodeled, into a paging receiver with the vibration type alert scheme according to user's requirement. What is required for remodeling is removing a battery casing from a printed circuit board of the sound type receiver and, then, replacing it with an alternative battery casing. While both of the battery casings, particularly their spaces for accommodating batteries, are substantially identical with each other, the battery used with the alternative casing is smaller in capacity than that used with the other. For example, assuming that a UM 3 battery is accommodated in the original battery casing, it is replaced with a UM 5 battery which is smaller in capacity and size than the UM 3 battery and, thereafter, a motor adapted for the vibration of the housing is placed in the remaining space of the battery casing and fixed in place by an adhesive tape or the like. The printed circuit board of each of such two different types of paging receivers is provided with a read only memory (ROM) and a label indicative of its function at the back and outside of the battery accommodating space of the battery casing.

A problem with the prior art procedure for the modification of the sound type receiver to the vibration type receiver is that it involves a substantial number of steps, i.e., removing the original battery casing from the printed circuit board, mounting the alternative battery casing on the printed circuit board, and reconnecting the alternative battery casing to the terminals of the printed circuit board. This results in poor maneuverability and a disproportionate number of structural elements required. Another problem is that the motor which is fixed in place by an adhesive tape is apt to be dislocated by shocks and impacts such as when the receiver is let fall. Further, the difference in the size of a battery to be used as previously stated is an annoyance for a user while a UM 5 battery, for example, has only a limited service life and is not available as easily as a UM 3 battery depending upon the country. Still another disadvantage is that when the battery cover is removed, the motor shows itself to degrade the appearance of the receiver. In addition, one cannot see the function label on the ROM unless he or she opens the housing to uncover the printed circuit board.

SUMMARY OF THE INVENTION

It is therefore an object of the present invention to enhance maneuverability and reduce the number of necessary parts when a paging receiver with the sound type alert scheme is modified into a paging receiver with the vibration type alert scheme.

It is another object of the present invention to provide an improved battery casing for a vibration type paging receiver which allows the use of a battery of the same capacity and size as a battery which is used with a sound type paging receiver.

It is another object of the present invention to provide an improved battery casing for a vibration type paging receiver which holds a motor concealed in the casing when a battery cover is removed for the replacement of the battery.

It is another object of the present invention to provide an improved battery casing which allows a person to see a function label bonded to a ROM on a printed circuit board by merely removing a battery cover.

It is another object of the present invention to provide a generally improved battery casing for a paging receiver.

A battery housing structure for a paging receiver which has a function of alerting a person to reception by causing a motor to vibrate a housing of the receiver of the present invention comprises a battery container for accommodating a battery, a generally box-like motor receiving portion provided on an outer side periphery of the battery container and having a recess which is complementary in shape to the motor, and a cover fastened to the motor receiving portion while covering the motor which is placed in the motor receiving portion, thereby fixing the motor to the motor receiving portion.

The above and other objects, features and advantages of the present invention will become more apparent from the following detailed description taken with the accompanying drawings.

DESCRIPTION OF THE PREFERRED EMBODIMENT

To better understand the present invention, a brief reference will be made to a prior art paging receiver, shown in FIG. 1. Generally, the prior art paging receiver 10 comprises a housing 12 and a battery cover 14 which forms a part of the housing 12 and is associated with a battery casing.

Figure 1:
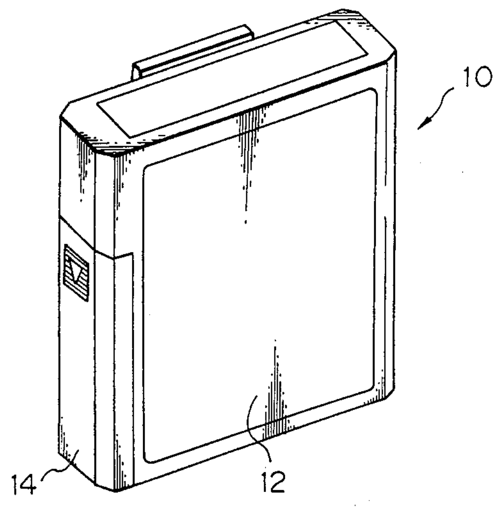
Fig. 1 PRIOR ART
FIG. 1 is an external view of a paging receiver which is implemented with a prior art battery casing.
Figure 2:
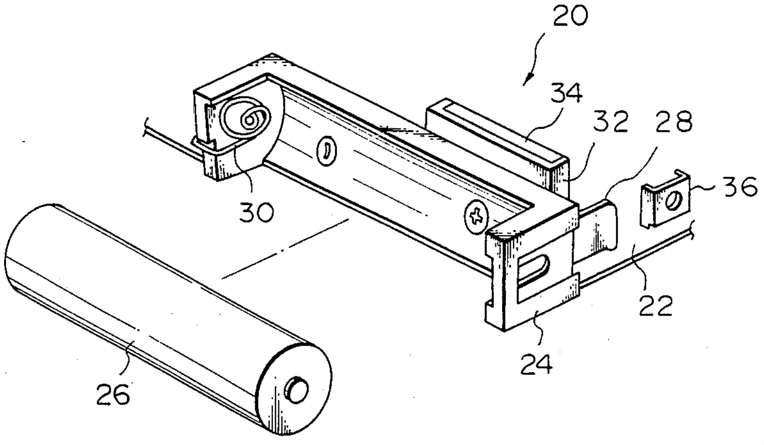
Fig. 2 PRIOR ART
FIG. 2 is an exploded view of a prior art battery casing installed in a paging receiver of the type which informs reception by sound.
Figure 3:
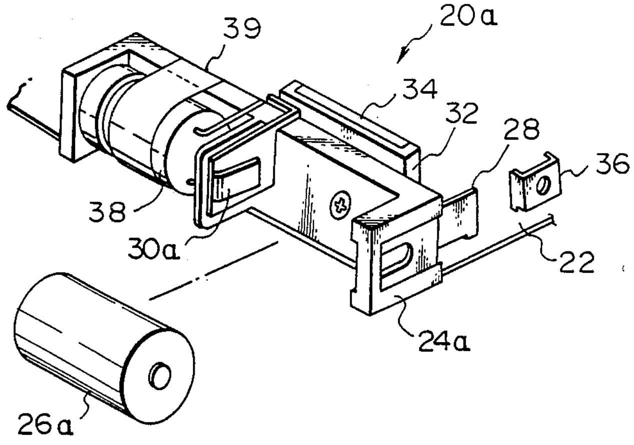
Fig. 3 PRIOR ART
FIG. 3 is an exploded view of a prior art battery casing installed in a paging receiver of the type which informs reception by the vibration of a housing of the receiver.

FIG. 2 shows a battery casing of a paging receiver which generally appears as shown in FIG. 1 and is constructed to alert a user to reception by sound, a housing of the receiver being removed in the drawing. The battery casing, generally 20, is made up of a printed circuit board 22, and a battery container 24 which is mounted on the printed circuit board 22 for accommodating a battery 26. The battery container 24 is provided with a positive terminal 28 and a negative terminal 30. A ROM 32 to which a label 34 is bonded adjoins the outside of the battery container 24 opposite to the battery receiving space. The reference numeral 36 designates a metal fitting adapted to fasten the housing 12 and printed circuit board 22 together. FIG. 3 shows in an external view a battery casing of a paging receiver of the type which informs a person of reception by the vibration of a housing of the receiver, a housing of the receiver being removed for clarity. In FIG. 3, the same or similar structural elements as those shown in FIG. 2 are designated by like reference numerals. In the battery casing 20*a* of FIG. 3, a motor 38 is accommodated and fixed in place by an adhesive tape 39.

Assume that the user of the sound type paging receiver 20 desires to modify it into the vibration type receiver 20*a*. The user removes the battery container 24 of FIG. 2 from the printed circuit board 22 and, then, mounts a battery container 24*a* which is configured to accommodate the motor 38, as shown in FIG. 3. The battery container 24*a* has the motor 38 fixed therein by the adhesive tape 39 and is provided with a negative terminal 30*a* adjacent to the motor 38. A battery 26*a* which is smaller than the battery 26 is used with the battery casing of FIG. 3. For example, when the battery 26 is a UM 3 battery, the battery 26*a* is a UM 5 battery. The ROM 32 is located adjacent to the side periphery of the battery container 24 or 24*a* which is mounted on the board 22. The positive terminal 28 and negative terminal 30 or 30*a* of the battery container 24 or 24*a* are soldered to the board 22, whereby the battery container 24 or 24*a* is fixed in place. The metal fitting 36 is soldered to the board 22 in order to rigidly connect the housing 12 to the board 22.

As previously stated, the prior art procedure for the modification of the sound type paging receiver 20 into the vibration type receiver 20*a* has various drawbacks. Removing the battery container 24 from the printed circuit board 22 and, then, mounting the other battery container 24*a* while replacing the terminal 30 is not only time- and labor-consuming but also disproportionate in the number of necessary parts. One cannot see the function label 34 on the ROM 32 unless he or she opens the housing 12 to let the board 22 show itself. Besides, the battery container 24 has to be replaced with the battery container 24*a* and, because the metal fitting 36 is soldered to the board 22 independently of the battery container 24, the battery container 24*a* is fixed merely by soldering the terminals 28 and 30*a* and, therefore, unstable in position relative to the board 22.

Referring to FIGS. 4 to 8, a battery casing for a paging receiver embodying the present invention is shown which is free from the drawbacks inherent in the prior art structure as discussed above. The paging receiver, generally 40, to which the present invention is applied is capable of notifying a user of reception by sound and the vibration of a housing selectively.

Figure 4:
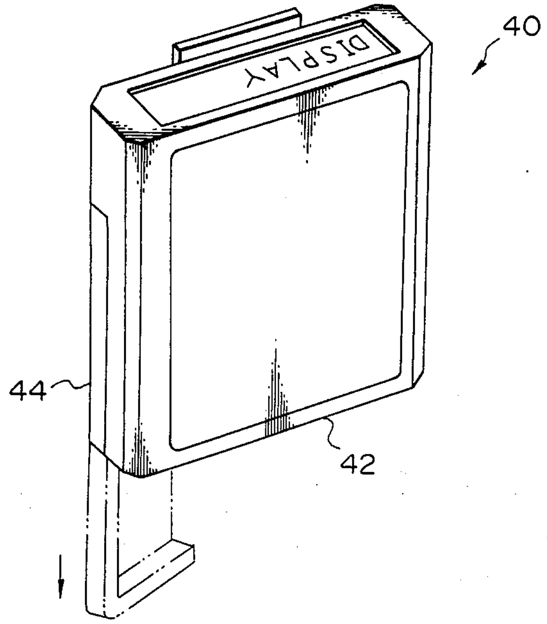
FIG. 4 is an external view of a paging receiver to which a battery casing in accordance with the present invention is applied.
Figure 5:
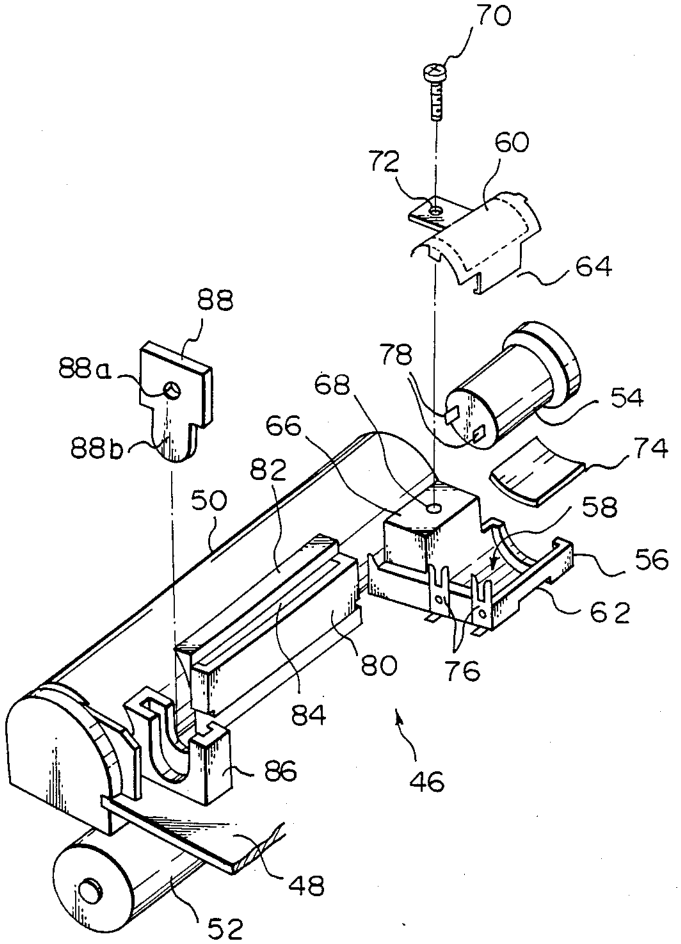
FIG. 5 is an exploded perspective view of a battery casing embodying the present invention which is applicable to the vibration type paging receiver.

As shown in FIG. 4, the receiver 40 generally comprises a housing 42 and a battery cover 44 which forms a part of the housing 42. The battery cover 44 may be pulled as indicated by an arrow so as to remove it from the housing 42. Installed in the housing 42 and battery cover 44 is a battery casing 46 as shown in FIG. 5. The battery casing 46 includes a battery container 50 which is mounted on a printed circuit board 48 to receive a battery 52 therein. The battery container 50 is provided with a motor receiving portion 56 adapted to mount a motor 54. Specifically, the motor receiving portion 56 is molded integrally with the outer periphery of the battery container 50 and provided with a generally box-like configuration, which includes a semicircular recess 58 complementary to the shape of the motor 54. A cover 60 is adapted to fix the motor 54 within the motor receiving portion 56 from the above and also provided with a semicircular configuration which is complementary to the shape of the motor 54. The cover 60 may be implemented with a thin sheet metal by way of example. The cover 60 is formed with a pawl 64 at one end thereof which is capable of mating with a notch 62 provided at the bottom of one side of the motor receiving portion 56. At the other end, the cover 60 is formed with a tongue 72 which is used to fasten by a tapping screw 70 the cover 60 to a threaded hole 68 of a fixing portion 66, which is provided between the battery container 50 and the motor receiving portion 56.

Figure 6:
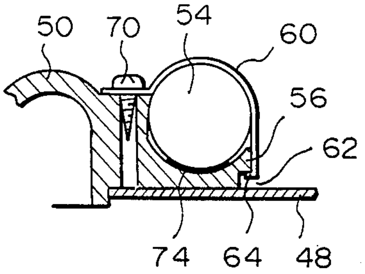
FIG. 6 is a fragmentary perspective view of the battery casing as shown in FIG. 5.

In the above construction, to fix the motor 54 received in the portion 56 in place, the cover 60 is placed on the motor 54 from above the motor 54, then the pawl 64 of the cover 60 is mated with the notch 62 of the portion 56, and then the tongue 72 of the cover 60 is fastened to the fixing portion 66 by the screw 70. This maintains the motor 54 fixed firmly in the portion 56. Further, as shown in FIGS. 5 and 6, a cushioning member 74 made of sponge or the like is laid in the recess 58 of the portion 56 so as to prevent the motor 54 from being dislocated or otherwise effected by shocks and impacts. Electrical connection between the motor 54 and the printed circuit board 48 is set up by soldering terminals 78 of the motor 54 to terminals 76 which are connected to the printed circuit board 48.

Figure 7:
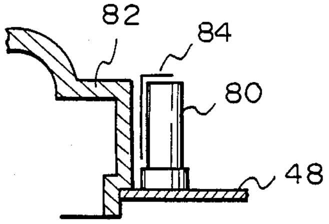
FIGS. 7 and 8, too, are fragmentary sections of the battery casing as shown in FIG. 5.

As shown in FIGS. 5 and 7, the battery casing 50 is provided with a projection 82 in a part of its side wall and along the ROM 80 which adjoins the side wall of the battery container 50. The battery container 50 is made of a semitransparent material so that the label 84 on the ROM 80 may be seen from the outside merely be removing the battery cover 44.

Figure 8:
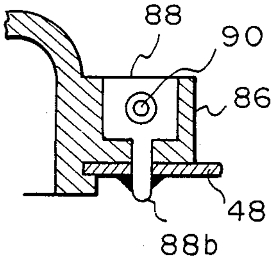

Further, as shown in FIGS. 5 and 8, the battery container 50 is formed with a generally box-like projection 86 in a part of its outer periphery, while a flat metal fitting 88 is press-fitted in the projection 86. Specifically, the metal fitting 88 is provided with a threaded opening 88*a* at its center and a tongue 88*b* at its lower end. The tongue 88*b* is inserted in an opening of the printed circuit board 48 and, then, soldered thereto, whereby the metal fitting 88 is fixed in place to in turn fix the battery casing 50 to the board 48. A screw 90 with which the housing 42 is provided beforehand is driven into the metal fitting 88 to rigidly connect the board 48 and the housing 42 to each other. it is to be noted that the metal fitting 88 is physically independent of a positive terminal, not shown, since molding them together would cause an antenna which is built in the receiver to be effected with respect to the electric field, resulting in the deterioration of sensitivity.

In summary, in accordance with this embodiment, a battery casing is molded at its outer periphery with a motor receiving portion which is provided with a semicircular recess complementary to the shape of a motor. The motor which is placed in the receiving portion is secured by a semicircular cover which is also complementary in shape to the motor. This allows a sound type receiver to be remodeled into a vibration type receiver without resorting to the replacement of a battery casing, while making it possible to mount the motor by fastening only.

When a battery cover is removed for the replacement of a battery, the motor remains concealed so that the receiver appears pleasant to the eye. In addition, it is needless for a user to replace the battery depending upon the alerting system, i.e. the sound type alert system or the vibration type alert system.

Because the battery container is made of a semi-transparent material and because the side wall of the battery container is partly protruded complementary to the shape of a ROM, a function label which is bonded to the ROM can be seen with ease merely by removing the battery cover.

Another advantage attainable with the embodiment shown and described is that the battery container can be fixed to a printed circuit board by press-fitting a flat metal fitting with a threaded hole in a generally box-like projection of the battery container and, then, soldering it to the board.

Various modifications will become possible for those skilled in the art after receiving the teachings of the present disclosure without departing from the scope thereof.

What is claimed is:

1. A battery housing structure for a paging receiver which has a function of alerting a person to reception by causing a motor to vibrate a housing of said receiver, comprising:

a battery container for accommodating a battery;

a generally box-like motor receiving portion provided on an outer side periphery of said battery container and having a recess which is complementary in shape to said motor; and a cover fastened to said motor receiving portion while covering said motor which is placed in said motor receiving portion, thereby fixing said motor to said receiving portion, said battery container comprising a side wall provided with a projection which extends perpendicular to a printed circuit board which is built in said receiver, said side wall adjoining a ROM and a label which is bonded to a side wall of said ROM and engraved with a function of said receiver and others, such that said label is visible from the outside of said battery container.

2. A battery housing structure for a paging receiver which has a function of alerting a person to reception by causing a motor to vibrate a housing of said receiver, comprising:

a battery container for accommodating a battery;

a generally box-like motor receiver portion provided on an outer side periphery of said battery container and having a recess which is complementary in shape to said motor; and a cover fastened to said motor receiving portion while covering said motor which is placed in said motor receiving portion, thereby fixing said motor to said motor receiving portion, said battery container comprising a side wall which extends perpendicular to a printed circuit board which is built in said receiver, a generally box-like projection extending from a part of said side wall, and a flat metal fitting formed with a threaded hole at a center thereof and a lug at a lower end thereof, said metal fitting being press-fitted in said box-like projection and, at the same time, said lug of said metal fitting being inserted in an opening which is formed through said printed circuit board and then soldered to said board.

3. A battery housing structure for a paging receiver which has a function of alerting a person to reception by causing a motor to vibrate a housing of said receiver, comprising:

a battery container for accommodating a battery;

a generally box-like motor receiving portion provided on an outer side periphery of said battery container and having a recess which is complementary in shape to said motor; and a cover fastened to said motor receiving portion while covering said motor which is placed in said motor receiving portion, thereby fixing said motor to said motor receiving portion, said battery container comprising a side wall which extends perpendicular to a printed circuit board which is built in said receiver, said motor receiving portion being molded integrally with said side wall.

4. A battery housing structure as claimed in claim 3, further comprising a cushioning member which is laid in said recess of said motor receiving portion for damping a shock applied to said motor to thereby stably fix said motor in place.

5. A battery housing structure as claimed in claim 3, wherein said cover comprises a thin sheet of metal having a configuration which is complementary to the shape of said motor.

* * * * *